(12) United States Patent
Vonmetz et al.

(10) Patent No.: US 10,747,011 B2
(45) Date of Patent: Aug. 18, 2020

(54) LASER AIMING SYSTEM RECYCLING STRAY LIGHT

(71) Applicant: Datalogic IP Tech, S.r.l., Bologna (IT)

(72) Inventors: Kurt Vonmetz, Bologna (IT); Davide Bottazzi, Bologna (IT)

(73) Assignee: Datalogic IP Tech, S.r.l., Bologna (IT)

( * ) Notice: Subject to any disclaimer, the term of this patent is extended or adjusted under 35 U.S.C. 154(b) by 189 days.

(21) Appl. No.: 16/101,183

(22) Filed: Aug. 10, 2018

(65) Prior Publication Data

US 2020/0050012 A1   Feb. 13, 2020

(51) Int. Cl.
| | |
|---|---|
| G02B 27/42 | (2006.01) |
| G02B 27/09 | (2006.01) |
| G02B 5/18 | (2006.01) |
| G06K 9/20 | (2006.01) |
| G06K 7/10 | (2006.01) |

(52) U.S. Cl.
CPC ....... *G02B 27/4255* (2013.01); *G02B 5/1814* (2013.01); *G02B 27/0944* (2013.01); *G06K 7/10732* (2013.01); *G06K 9/209* (2013.01)

(58) Field of Classification Search
CPC ... G02B 5/1814; G02B 19/0052; H01S 3/005; H01S 3/05; H01S 3/10; H01S 3/08; G06K 7/10722; G06K 7/1413; G06K 2007/10524
USPC .................. 372/92, 98, 99, 101, 103, 108
See application file for complete search history.

(56) References Cited

U.S. PATENT DOCUMENTS

| | | | |
|---|---|---|---|
| 8,030,630 B2 | 10/2011 | Tan et al. | |
| 2003/0035461 A1* | 2/2003 | Tsikos | G02B 19/009 372/108 |
| 2009/0109534 A1 | 4/2009 | Gurevich et al. | |
| 2013/0043312 A1* | 2/2013 | Van Horn | G06K 7/10831 235/462.1 |
| 2016/0041359 A1* | 2/2016 | Gaskin | G01N 21/39 250/573 |
| 2017/0131560 A1 | 5/2017 | Liao et al. | |
| 2019/0171854 A1* | 6/2019 | Vonmetz | G06K 7/10722 |

* cited by examiner

*Primary Examiner* — William C. Dowling
(74) *Attorney, Agent, or Firm* — Cozen O'Connor

(57) ABSTRACT

A laser light projection apparatus is provided for projecting laser light onto the surface of a target object. The laser light projection apparatus includes a laser light source that generates laser light and a housing with a cavity therein defined by sidewalls, at least a portion of which have one or more reflective surfaces. The cavity extends along a center axis of the laser light and has a first portion at which a distance between opposing sidewalls is less than a distance between opposing sidewalls at a second portion of the cavity at a distance farther from the laser light source than the first portion. At least a portion of the laser light generated by the laser light source is reflected from the reflective surface of the sidewalls to form a two-dimensional pattern spaced apart from the center axis.

20 Claims, 10 Drawing Sheets

LASER AIMING SYSTEM RECYCLING STRAY LIGHT

BACKGROUND

Technical Field

This description generally relates to devices for projecting patterns of laser light onto a surface. This description also generally relates to handheld devices equipped with an aiming system for projecting a pattern of laser light corresponding to an area from which optical information (e.g., encoded in machine-readable symbols) is to be obtained.

Description of the Related Art

In some industries, machine-readable symbols located on surfaces of items, packages, and other target objects may be optically acquired and decoded to obtain information related to the target object. For instance, handheld optical reader devices may be equipped to read machine-readable symbols (e.g., one-dimensional or barcode symbols, two-dimensional area or matrix symbols) on the item, package, or a label to obtain information, for instance information regarding the item or a destination of the package. In connection with the reading operation, the devices may present an indication of where the information is to be obtained. Some machine-readable symbol readers may project a single small area of light indicating a center of an area from which the optical information will be obtained.

In some applications, users may wish to project a more complex pattern indicating the area to be scanned. In such applications, diffractive optical elements or complex refractive elements may be required to generate the complex pattern. Diffractive optical elements may be incorporated to homogenize, split and/or shape light emitted into the desired complex pattern. Complex refractive elements may comprise one or more lenses having a complex shape (e.g., saw tooth shape) or a series of lenses that refract generated light in a particular manner to refract or deflect light to achieve the desired patterns. These solutions for generating more complex patterns, however, add to the cost and complexity of the optical reader. At least some of these solutions require additional labor to calibrate and properly align these complex optical systems with the corresponding optical reader systems.

BRIEF SUMMARY

A laser light projection apparatus may be summarized as including a laser light source that generates laser light centered along a center axis; and a housing having an aperture from which the laser light generated by the laser light source is emitted and a cavity extending along a center axis of the laser light source and being defined at least in part by sidewalls at least a portion of which have a reflective surface, a first distance between opposing sidewalls at a first portion of the cavity being less than a second distance between the opposing sidewalls at a second portion of the cavity located farther from the laser light source than the first portion along the center axis, wherein the reflective surface of the sidewalls cause a portion of the laser light to be emitted from the aperture at angles divergent from the center axis. One or more of the sidewalls may be oriented at an acute angle with respect to the central axis. A cross-sectional area of the cavity may increase along a length of the center axis in a direction toward the aperture. The portion of the laser light emitted from the aperture may form a two-dimensional pattern spaced apart from the center axis. The two-dimensional pattern formed may have a circular shape. The cavity may have a circular cross-sectional shape defined by the sidewalls. The circular shape may have a thickness corresponding to a length of the reflective surface in a direction along the center axis. The two-dimensional pattern formed may have a rectangular shape. The rectangular shape may have segments equal in length to each other. The rectangular shape may have segments unequal in length to each other. The cavity may be defined by two or more pairs of the opposing sidewalls. Each of the sidewalls may have a curvilinear shape concave with respect to the center axis.

A first pair of the two or more pairs of opposing sidewalls may be oriented at a first angle with respect to the center axis and a second pair of the two or more pairs of opposing sidewalls may be oriented at a second angle with respect to the center axis, the second angle being different than the first angle. A size of the two-dimensional pattern may correspond to an acute angle of the sidewalls with respect to the center axis. A thickness of one or more segments forming the two-dimensional pattern may correspond to a length of the reflective surface in a direction along the center axis. The angles of the laser light emitted from the aperture may correspond to an angle at which the sidewalls are oriented with respect to the center axis.

The laser light projection apparatus may further include a single collimating lens positioned in the housing between the cavity and the aperture.

A central portion of the laser light may be occluded in some implementations. The cavity may have a frustoconical shape centered along the center axis, a wider end of the cavity being located closer to the aperture than a narrower end of the cavity.

A machine-readable symbol reader may be summarized as including a housing having a cavity delimited by at least one sidewall and having a principal axis, the cavity which extends along the principal axis from a first position to an aperture, the cavity having at least one lateral dimension that increases along at least a portion of the principal axis of the cavity as at least a portion of the cavity is traversed in a direction toward the aperture, and at least a portion of the sidewall of cavity having a reflective surface; and a laser light source that emits laser light, the laser light source positioned and oriented to emit a first portion of the laser light along a principal emission axis that is co-linear with the principal axis of the cavity and emit a second portion of the laser light toward the at least one sidewall of the cavity, wherein the reflective surface of the at least one sidewall of the cavity cause a second portion of the laser light to be emitted from the aperture at angles divergent from the principal emission axis.

DETAILED DESCRIPTION

Technologies described and depicted herein relate to a laser light projection apparatus that emits a projection of laser light that, when incident upon a surface of a target object, displays a two-dimensional pattern spaced apart from a center axis of the laser light. This is achieved without the use of a plurality of lenses and without the use of diffractive optical elements or complex or compound refractive elements. A housing of the laser light projection apparatus has an internal cavity defined by sidewalls extending along the center axis. The sidewalls are oriented at an acute angle with respect to the center axis such that the cavity has a frusto-conical shape. A reflective surface of the sidewalls reflect at least a portion of laser light generated by a laser light source, causing laser light to be emitted from an aperture of the laser light projection apparatus at an angle with respect to the center axis. When the laser light projection apparatus is directed at a target object, the reflected light so emitted forms a two-dimensional pattern on the surface of the target object spaced apart from the center axis of the laser light.

Figure 1:
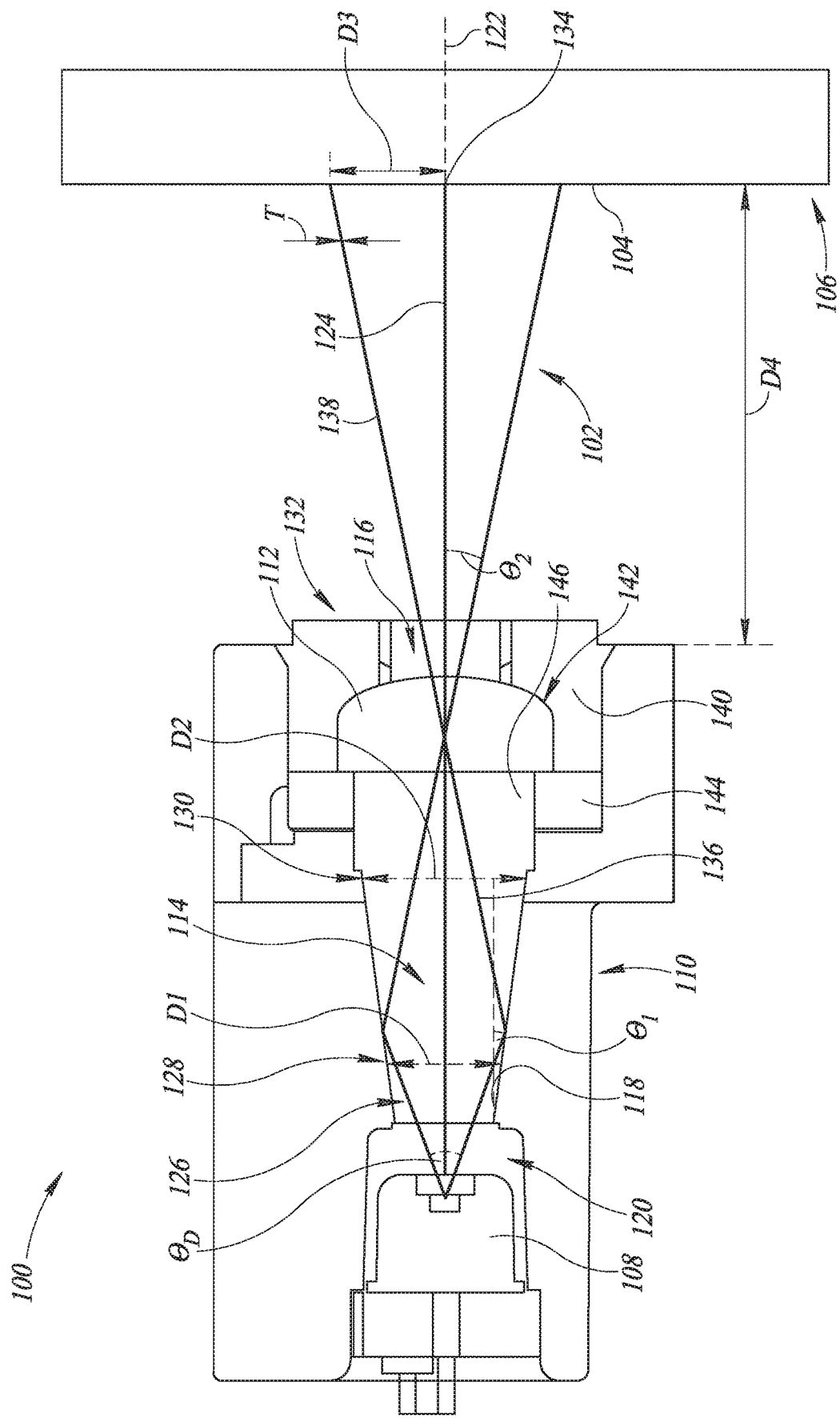
FIG. 1 is a longitudinal cross-sectional view of a laser light projection apparatus according to one or more implementations.

FIG. 1 shows a laser light projection apparatus 100 projecting laser light 102 onto a surface 104 of a target object 106 according to one or more implementations. The laser light projection apparatus 100 may, for example, take the form or form a portion of a machine-readable symbol reader, operable to read machine-readable symbols (e.g., one-dimensional or barcode symbols, two-dimensional or area or matrix code symbols).

The laser light projection apparatus 100 includes a laser light source 108 that emits the laser light 102, a housing 110, and a collimating lens 112. The housing 110 includes a cavity 114 that extends at least partially there through along a central axis 122 of the laser light 102. The housing 110 also includes an aperture 116 from which laser light 102 exits from the laser light projection apparatus 100. The cavity 114 is defined by sidewalls 118 extending in a direction along the center axis 122 from a light source housing portion 120 toward the aperture 116. The cavity 114 has a lateral cross-sectional shape defined by a lateral cross-sectional shape of the sidewalls 118. At least a portion of sidewalls 118 have a reflective surface that faces inwardly toward the axis 122 extending through a center of the length of the cavity 114 along which a central portion 124 of the laser light 102 travels from the laser light source 108 and is emitted from the aperture 116.

The laser light source 108 emits laser light 102 that has a non-zero angle of divergence $\theta_D$. The angle of divergence $\theta_D$ in commercially available and viable lasers of this type is typically between 10° and 40°. Some commercial laser diodes of this type may have an elliptical emission profile with an emission angle along a first axis in the range of 5° and 15°, and an emission angle along a second axis perpendicular to the first axis in the range of 25° and 40°. As a result, some of the laser light 102 is incident upon the sidewalls 118 (i.e., divergent portion 126) whereas some of the laser light 102 is directly incident on the collimating lens 112 (i.e., central portion 124) without striking the sidewalls 118. A divergent portion 126 of the laser light 102 is emitted from the laser light source 108 in directions other than along or in parallel to the axis 122. The divergent portion 126 is laser light emitted from the laser light source 108 in a cone-shaped pattern and having a narrow angle (e.g., 10°-40°) such that the laser light is incident upon the sidewalls 118. By contrast, the central portion 124 of the laser light 102 is emitted from the aperture 116 without being reflected from the sidewalls 118. As described below in greater detail, at least some of the divergent portion 126 of the laser light 102 is reflected from the reflective surface(s) of the sidewalls 118 and emitted from the aperture 116 as a two-dimensional pattern spaced apart from the central portion 124. The aperture 116 may be part of a lens housing portion 132 securing the collimating lens 112 to or at least partially within the housing 110.

The housing 110, at least in part, may be comprised of a material sufficiently rigid to hold the laser light source 108 in a static position therein. In some implementations, the housing 110 is comprised of metal. In such implementations, the housing 110 may be formed by a die casting process in which a liquid metal is introduced into a cavity of a mold or tooling wherein the liquid metal is allowed to cool and harden to permanently form the housing 110. Aluminum is an example of a metal that can be used in such a process; however, other metals or metal alloys may be appropriate, such as zinc, copper, brass, titanium, iron, and steel, by way of non-limiting example. Other methods and materials for forming the housing 110 are also considered as being within the scope of the present disclosure. For instance, the housing 110 may comprise plastic formed by an injection molding process (or other appropriate process) in which molten plastic is introduced into a volume having the desired shape and allowed to cool and harden to form at least part of the housing 110.

At least a portion of the sidewalls 118 forming the cavity 114, either as a result of the material used in the formation process or as a result of a treatment process performed after formation, have a surface effective for reflecting laser light 102 incident thereon. After formation of the housing 110 as described herein, at least a portion of the sidewalls 118 of the housing 110 may be treated to improve a specular reflective property of the surface. As one example, an anodizing process may be performed on the surface of metal to form a layer thereon that has light reflecting properties. For instance, aluminum comprising or covering the sidewalls 118 may be submerged in an electrolytic solution wherein direct current is applied to the aluminum to form a reflective layer. As a result of the anodizing process, the treated portions of the housing 110 may have a different color, such as black, gold, or white. As another example of a treatment process, the surface of the sidewalls 118 may be polished or buffed to improve the reflectivity of the surface. As a further example, a reflective coating may be applied to the surface of the sidewalls 118. The reflectivity of such a treated surface may be measured based on the amount of light reflected and/or by the smoothness of the surface. A reflective surface, as described herein, refers to a surface that reflects at least 20% of light incident thereon, or to a surface having a roughness average Ra of less than 100 nm.

The cavity 114 has a longitudinal cross-sectional shape that is narrower at a first portion 128 of the cavity 114 than at a second portion 130 of the cavity farther away from the laser light source 108 than the first portion 128. In particular, the sidewalls 118 are oriented at an acute angle $\theta_1$ with respect to the axis 122 such that the cavity 114 becomes wider along its length. Accordingly, a distance D1 between opposing sidewalls 118 at a first portion 128 of the cavity 114 may be less than a distance D2 between opposing sidewalls 118 at the second portion 130 of the cavity 114 located farther from the laser light source 108 along the axis 122. The angled sidewalls 118 cause at least some of the divergent portion 126 of the laser light 102 to be emitted from the aperture 116 at an angle $\theta_2$ with respect to the axis 122. The longitudinal cross section of the cavity 114 may increase along the length of the cavity 114 between the light source housing portion 120 and the lens housing portion 132. For instance, the cavity 114 may have a frustoconical shape with a wider end located at or adjacent to the lens housing portion 132 and the narrower end located at or adjacent to the laser light source housing portion 120. In some implementations, the distance D2 may be smaller than the distance D1 such that the cavity has a frustoconical shape with a wider end closer to the laser light source 102 than the narrower end.

The central portion 124 of the laser light 102 travels along the axis 122 and may be emitted from the laser light projection apparatus 100 to form a spot 134 on the surface 104 of the target object 106. At least some of the divergent portion 126 of laser light 102 is reflected from the reflective surface of the sidewalls 118 and emitted at the angle $\theta_2$ as reflected light 136. A lateral cross section of the reflected light 136 in a lateral direction transverse to the axis 122 forms a pattern corresponding to a lateral cross section of at least a portion of the cavity 114 at which the divergent light 126 is reflected from the surface of the sidewalls 118. The reflected light 136 emitted from the aperture 116 has an angle $\theta_2$ diverging from the center axis 122 and striking the surface 104 of the target object 106 at locations spaced apart from the spot 134. The reflected light 136 incident upon the surface 104 forms a two-dimensional pattern, e.g., an aiming pattern, comprising one or more beams 138 spaced apart from the axis 122 at a distance D3.

The two-dimensional pattern formed on the surface 104 also corresponds to the lateral cross section of the cavity 114 where the divergent light 126 is reflected from the surface of the sidewalls 118. The one or more beams 138 forming the two-dimensional pattern have a thickness T based at least in part on characteristics of the lens 112. For instance, the thickness T may be a result of off-axis optical aberration of the lens 112. A shape of the two-dimensional pattern produced corresponds to the lateral cross-sectional shape of the reflective sidewalls 118. The off-axis optical aberration may be corrected by implementing a housing 110 having reflective sidewalls 118 that are curvilinear with respect to the axis 122. For example, a shape of the opposing sidewalls 118 shown in FIG. 1 may have a concave shape with respect to the axis 122 such that the cavity 114 has tapered walls that curve along their length. The distance D3 of the one or more beams 138 from the axis 122 is based at least in part on the angle $\theta_1$ of the sidewalls 118. The distance D3, for example, may be inversely proportional to the angle $\theta_1$ such that a laser projection apparatus 100 having sidewalls 118 with a smaller angle $\theta_1$ will produce a pattern having one or more beams 138 spaced apart at a larger distance D3 than a laser projection apparatus 100 with sidewalls 118 having a relatively larger angle $\theta_1$, assuming the surface 104 is spaced apart from the laser projection apparatus 100 at the same distance.

The collimating lens 112 is an optical element that collimates the laser light 102 to be parallel with or at least directed at a smaller angle with respect to the axis 122. In particular, the collimating lens 112 may cause laser light 102 entering the collimating lens 112 at a first angle with respect to the axis 122 to exit the collimating lens 112 at a second angle that is less than the first angle. The collimating lens 112 causes the central portion 124 of the laser light 102 into a parallel beam focused at the spot 134. A side of the collimating lens 112 facing the aperture 116 has a convex surface with respect to the aperture 116. A side of the collimating lens 112 facing the laser light source 108 may be flat or convex with respect to the laser light source 108. As a result of the reflective angled sidewalls 118, a single collimating lens 112 is sufficient to generate the two-dimensional laser light pattern spaced apart from the axis 122. This simplifies the design of the laser light projection apparatus 100 over other devices which may require complex or compound optical elements to achieve a similar effect. For example, to produce patterns or multiple beams, some previous solutions involved implementing diffractive optical elements or compound or complex refractive optical elements, increasing the cost and/or complexity of the device. By contrast, the laser projection apparatus 100 may include a single lens (i.e., collimating lens 112) to focus the laser light 102.

The lens housing portion 132 is provided to retain the collimating lens 112 within the laser projection apparatus 100. The lens housing portion 132 may include a front portion 140 having a lens retaining cavity 142 having a size and shape corresponding to the size and shape of at least the aperture-facing convex surface of the collimating lens 112. The aperture 116 may be provided in the front portion 140 of the lens housing portion 132 for emitting collimated laser light 102 therefrom. The front portion 140 may be securely attached to the housing 110 that includes the sidewalls 118. For example, with the collimating lens 112 positioned between the housing 110 and the front portion 140, the front portion 140 may be secured by adhesive to a front surface of the housing 110 or threadably attached to corresponding threaded sidewalls of the housing 110. The lens housing portion 132 may further include a rear portion 144 for supporting a surface of the collimating lens 112 facing the laser light source 108. The rear portion 144 may have an annular shape with an aperture allowing the laser light 102 to pass from the cavity 114 to the collimating lens 112. The rear portion 144 may engage or interface with the front portion 140 to secure the collimating lens 112 therebetween. A passage 146 may extend through the lens housing portion 132 through which the central portion 124 and the reflected light 136 may travel from the cavity 114 to the aperture 116. In some implementations, the lens housing portion 132 may have different properties than the housing 110—for example, surfaces of sidewalls along the passage 146 and/or surfaces of the lens retaining cavity 142 may not be reflective or may not be as reflective as the surfaces of the sidewalls 118. As a result, some of the divergent portion 126 of the laser light 102 incident upon surfaces within the lens housing portion 132 may be absorbed or may not be as effectively reflected as the reflected light 136.

Figure 2:
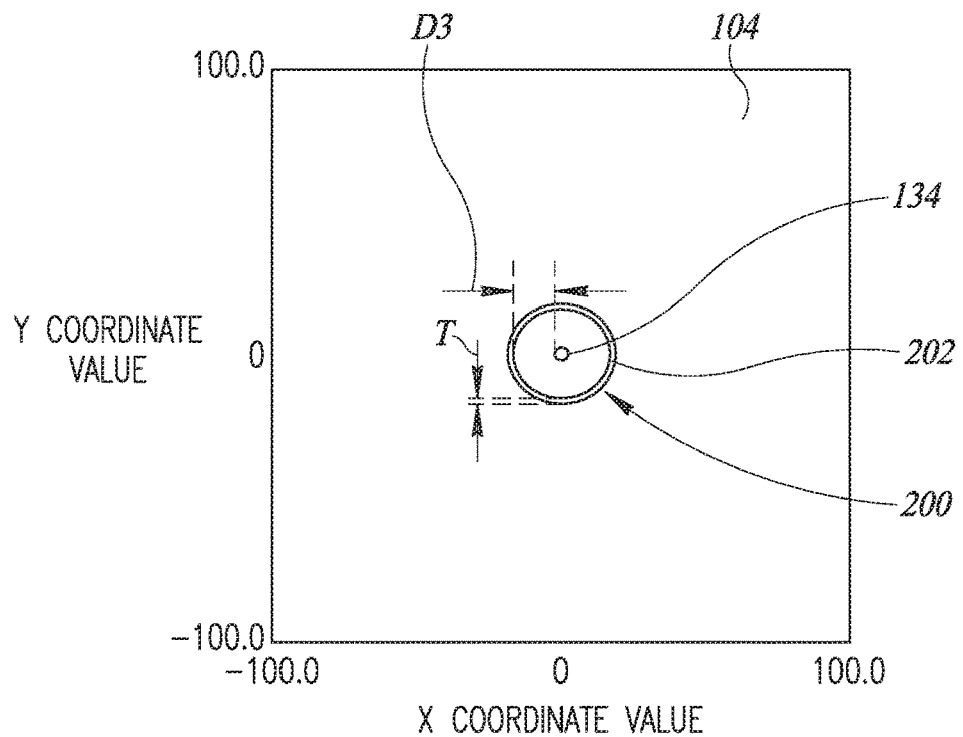
FIG. 2 is a plan view showing a first projection of laser light having a circular two-dimensional pattern projected onto a surface of a target object by a laser light projection apparatus of FIG. 1 according to one or more implementations.

FIG. 2 shows a projection 200 of the laser light 102 projected by the laser projection apparatus 100 on the surface 104 of the target object 106 according to one or more implementations. In the following descriptions, the surface 104 is separated at a fixed distance D4 (e.g., 300 mm) from the laser light projection apparatus 100, as shown in FIG. 1. The projection 200 includes the spot 134 and a two-dimensional pattern 202 surrounding the spot 134. As discussed above, the spot 134 is comprised of the central portion 124 of laser light 102 collimated by the collimating lens 112. The shape of the two-dimensional pattern 202 depends on the shape of reflective surfaces of the sidewalls 118 defining the cavity 114. In this instance, the laser light projection apparatus 100 generating the, the two-dimensional pattern 202 has sidewalls 118 forming a cavity 114 with a circular cross section. The circular cross section of the cavity 114 in this instance becomes wider along the axis 122 in a direction from the laser light source 108 to the aperture 116 such that the cavity 114 has a frustoconical shape. At least some of the divergent portion 126 of the laser light 102 is reflected one or more times from the reflective surface of the sidewalls 118, then emitted from the aperture 116 in a circular two-dimensional pattern centered on the axis 122.

Figure 3:
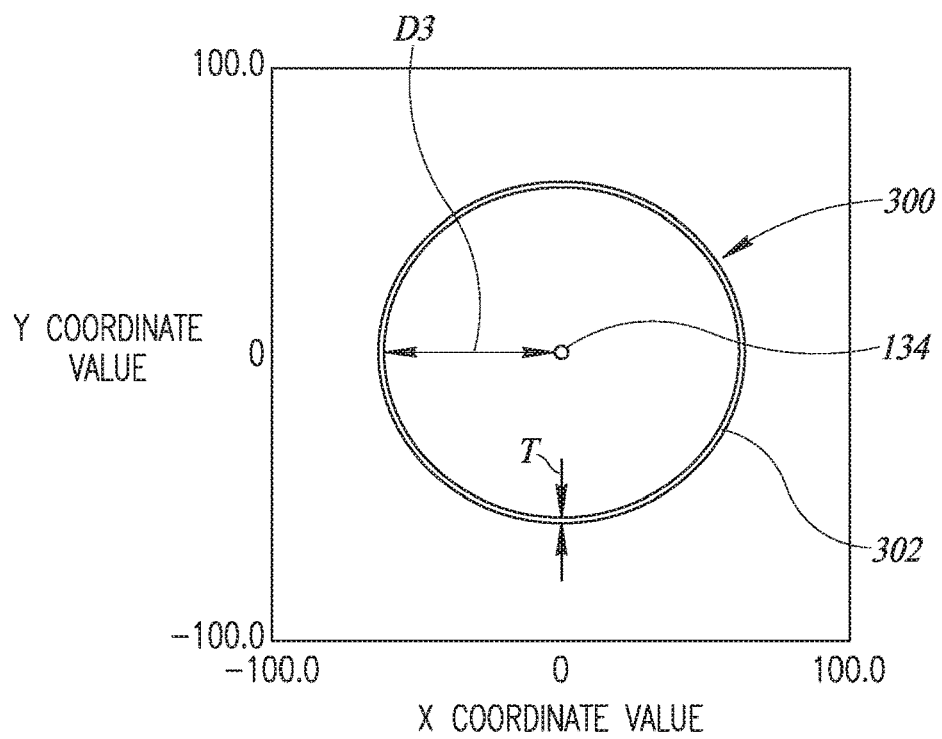
FIG. 3 is a plan view showing a second projection of laser light having a circular two-dimensional pattern projected onto a surface of a target object by a laser light projection apparatus of FIG. 1 according to one or more implementations.

The two-dimensional pattern 202 is spaced apart from the spot 134 at the distance D3 that is dependent at least in part on the angle $\theta_1$ of the sidewalls 118 relative to the axis 122. The distance D3 may also depend on at least in part on the focal length of the lens 112. For instance, the angle $\theta_2$ of the reflected light 136 is inversely proportional to the angle $\theta_1$ of the sidewalls 122 relative to the axis 122. As a result, for a fixed distance D4 and a fixed focal length of the lens 112, the size of the two-dimensional pattern of a projection of the laser light 102 may be modified by changing the angle $\theta_1$ of the sidewalls 118 and without changing other aspects of the laser light projection apparatus 100. Referring to FIG. 3, for example, a projection 300 of the laser light 102 having a two-dimensional pattern 302 with a larger circular shape than the two-dimensional pattern 202. The projection 300 is generated by a laser light projection apparatus 100 with sidewalls 118 oriented at an angle $\theta_1$ smaller than the angle $\theta_1$ of the sidewalls 118 of a laser light projection apparatus 100 generating the projection 200. The thickness T of the projection of laser light on the surface 104 for the laser projection apparatus 100 located at a fixed distance D4 is dependent at least in part on optical aberrations introduced as a result of optical characteristics of the lens 112. The two-dimensional patterns 202 and 302 are radially symmetric. However, the cross-sectional shape of the cavity 114 may be modified to produce a two-dimensional pattern 202/302 that is symmetric about of the X and Y axes with respect to the center axis 122. For example, the cross-section of the cavity 114 may have an elongated circular shaped cross section with opposing sidewalls 118 spaced apart at a greater distance along one axis than the other.

Figure 4:
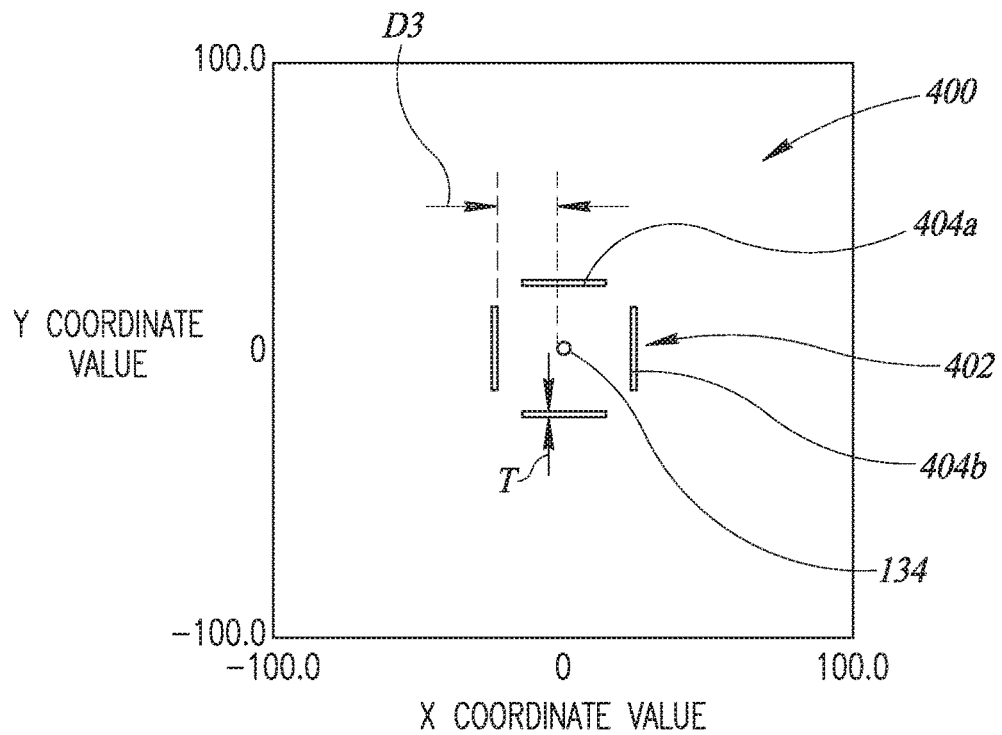
FIG. 4 is a plan view of a third projection of laser light having a rectangular two-dimensional pattern projected onto a surface of a target object by a laser light projection apparatus of FIG. 1 according to one or more implementations.

The laser projection apparatus 100 may project two-dimensional patterns having polygonal shapes other than a circular shape. FIG. 4 shows a projection 400 generated by the laser projection apparatus 100, the projection 400 comprising the spot 134 at the center of a rectangular two-dimensional pattern 402. The rectangular two-dimensional pattern 402 comprises four segments 404 each of which is spaced apart from the spot 134 at the distance D3. Horizontally extending segments 404a are arranged above and below the spot 134 while vertically extending segments 404b are arranged on opposite sides of the spot 134. In this implementation, the rectangular two-dimensional pattern 402 is discontinuous such that each of the segments 404 has ends separated from ends of adjacent segments 404. A rectangular two-dimensional pattern 402 having a continuous shape joined at vertices between segments 404a and 404b may be generated using a housing 110 having a different cross-sectional shape than those described with respect to, and depicted in, FIGS. 6A and 6B.

Figure 5A:
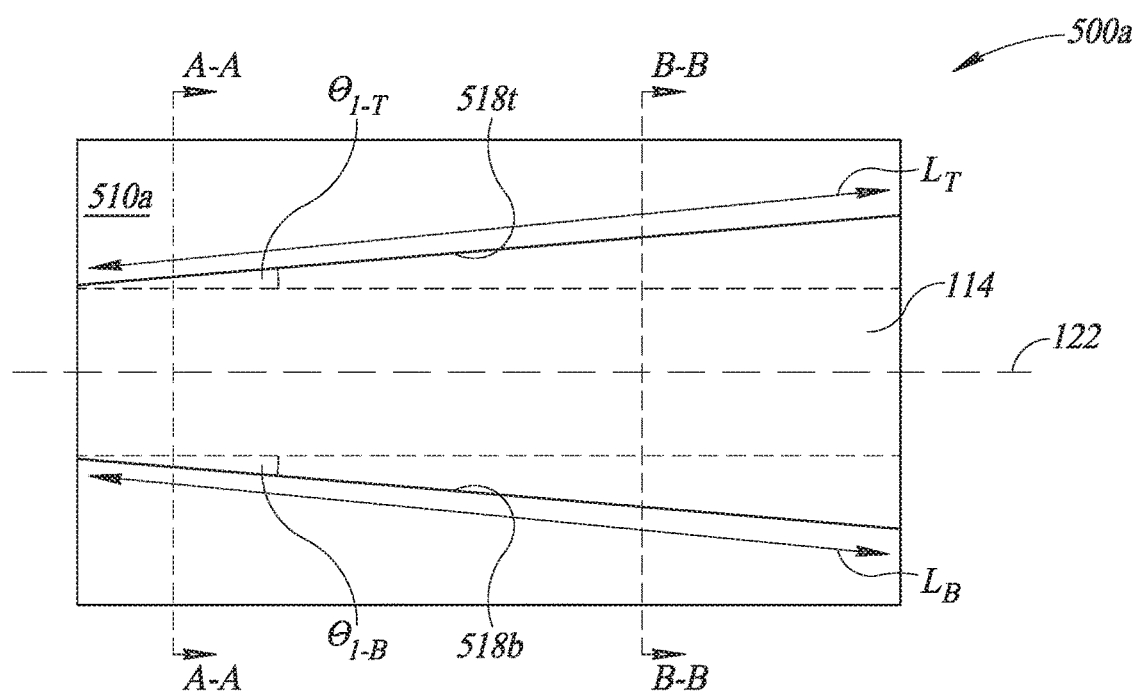
FIG. 5A is a longitudinal cross-sectional side view of a housing of a laser light projection apparatus producing the third projection of FIG. 4.
Figure 5B:
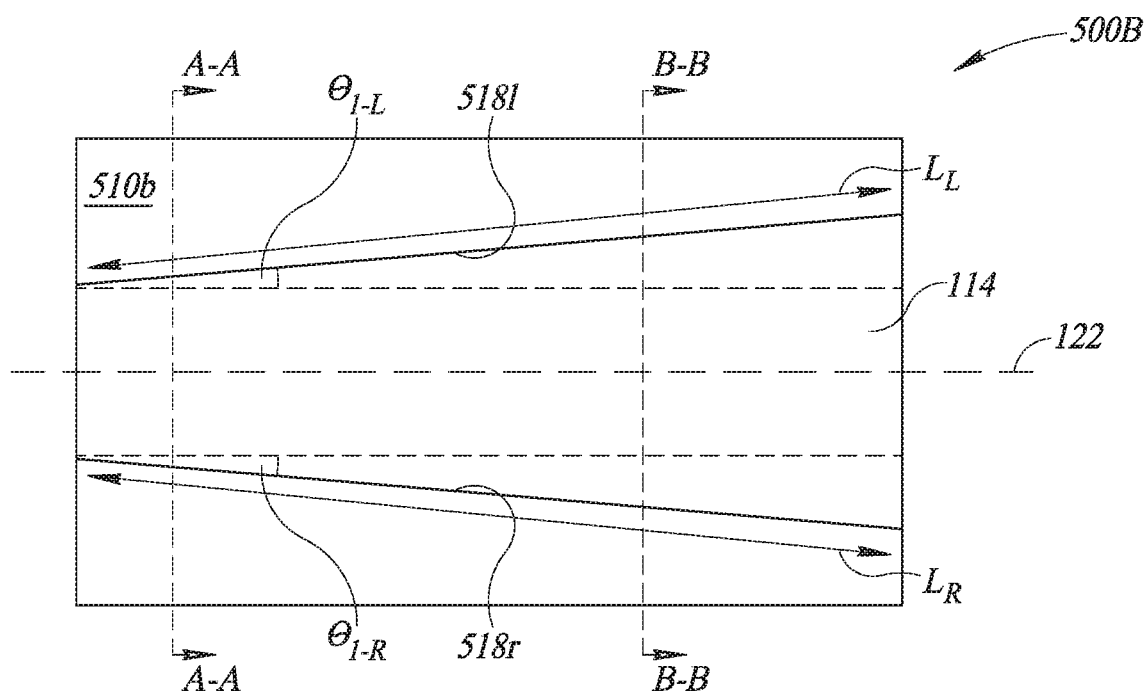
FIG. 5B is a longitudinal cross-sectional overhead view of a housing of a laser light projection apparatus producing the third projection of FIG. 4.

FIGS. 5A and 5B show longitudinal cross sections 500a and 500b of a housing 510 of the laser projection apparatus 100 taken along the axis 122 according to one or more implementations. A vertical cross section 510a of the housing 510 shown in FIG. 5A is orthogonal to a horizontal cross section 510b of the housing 510 shown in FIG. 5B. The housing 510 is the same as the housing 110 described above with respect to FIG. 1 with the exception that the housing 510 has four sidewalls 518 instead of the single circular sidewall 118 described above. The sidewalls 518 define the cavity 114 and have the same optically reflective properties as the sidewalls 118. The housing 510 is used to produce polygonal two-dimensional patterns, such as the rectangular two-dimensional pattern 402 of FIG. 4.

The vertical cross section 510a of the housing 510 includes a pair of opposing top and bottom sidewalls 518t and 518b respectively. The horizontal cross section 510b also has opposing left and right sidewalls 518l and 518r respectively. Each of the sidewalls 518 has a corresponding angle $\theta_1$ with respect to the axis 122. The pair of opposing top and bottom sidewalls 518t and 518b respectively has angles $\theta_{1T}$ and $\theta_{1B}$ that are equal to each other and constant along the lengths $L_T$ and $L_B$ of the respective sidewalls 518t and 518b. Similarly, the pair of opposing left and right sidewalls 518l and 518r respectively has angles $\theta_{1L}$ and $\theta_{1R}$ that are equal to each other and constant along the lengths $L_L$ and $L_R$ of the respective sidewalls 518l and 518r. Although the terms "top," "bottom," "left," and "right," are used in connection with FIGS. 5A and 5B, these terms are used to describe each direction relative to the others and are not intended to imply an absolute orientation of the laser projection apparatus 100.

Figure 6A:
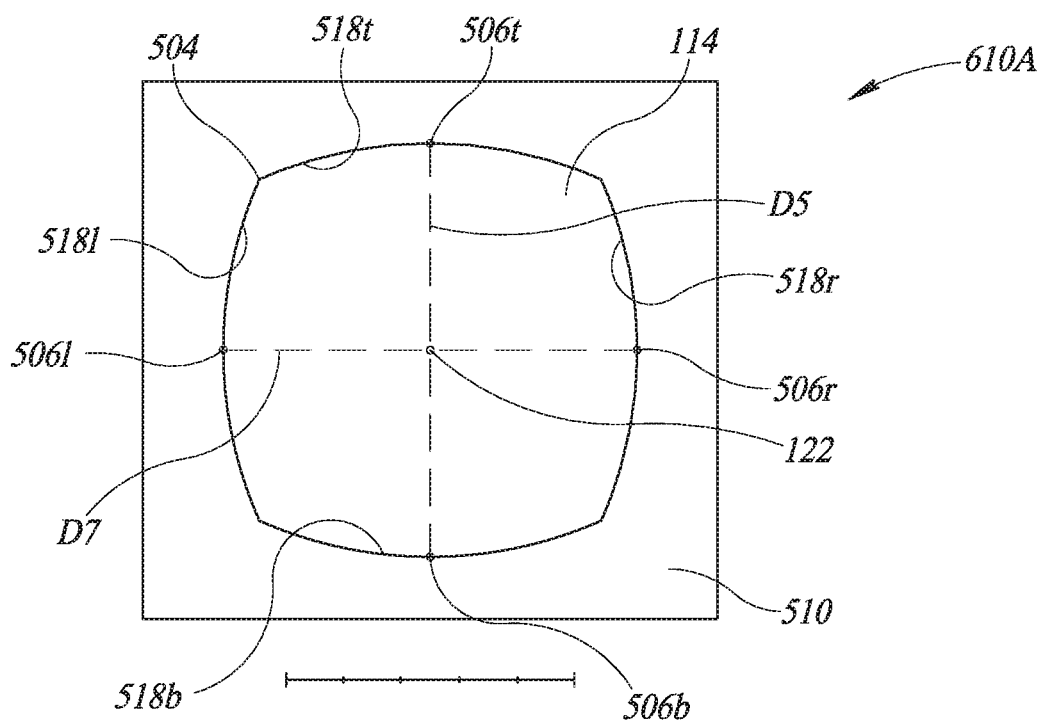
FIG. 6A is a lateral cross-sectional view of the housing shown in FIGS. 5A and 5B taken along the lines A-A.
Figure 6B:
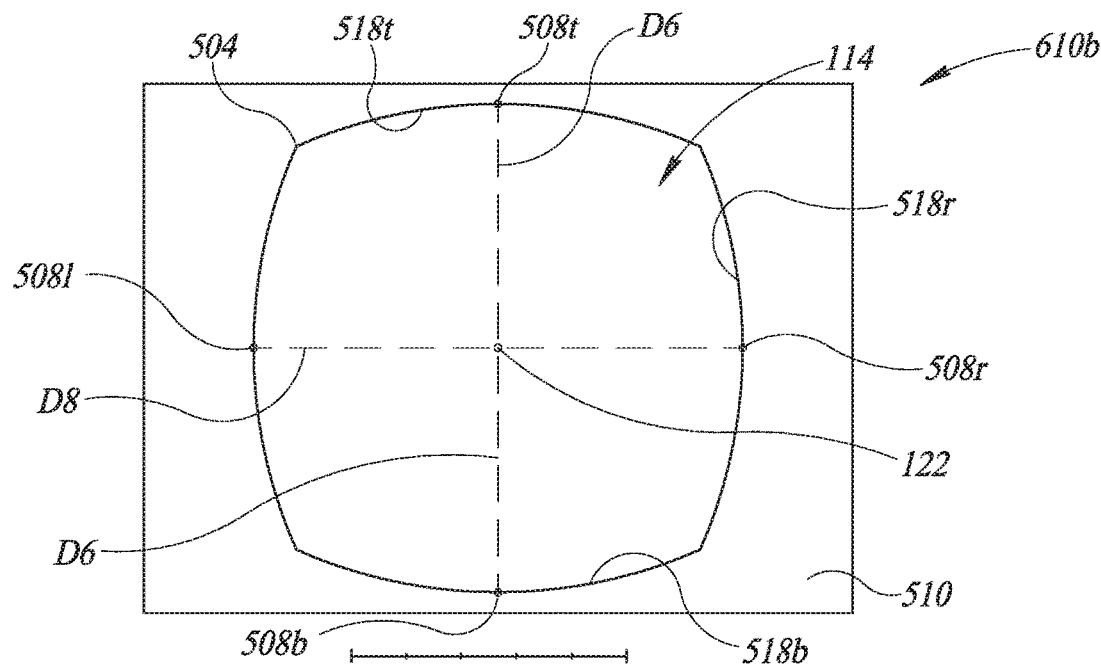
FIG. 6B is a lateral cross-sectional view of the housing shown in FIGS. 5A and 5B taken along the lines B-B.

FIGS. 6A and 6B show lateral cross sections 610a and 610b respectively taken along the lines A-A and B-B shown in FIGS. 5A and 5B. The lateral cross sections 610a and 610b are of a housing used to generate the rectangular two-dimensional pattern 402. In particular, FIG. 6A shows a lateral cross section 610a of the housing 510 used to generate the projection 400 having the rectangular two-dimensional pattern 402 taken along the line A-A shown in FIGS. 5A and 5B. FIG. 6B shows a lateral cross section 610b of the housing 510 used to generate the projection 400 having the rectangular two-dimensional pattern 402 taken along the line B-B shown in FIGS. 5A and 5B.

The sidewalls 518 of the housing 510 have a parabolic or curvilinear lateral cross-sectional shape extending between respective pairs of vertices 504. The curvilinear shape of each sidewall 518 is concave, curving outwardly away from the axis 122. Because the angles $\theta_{1T}$ and $\theta_{1B}$ of the opposing top and bottom sidewalls 518t and 518b and the angles $\theta_{1L}$ and $\theta_{1R}$ of the left and right sidewalls 518l and 518r are all equal and acute in this implementation, the cross-sectional area of the cavity 114 increases along the axis 122 farther away from the laser light source 108. Accordingly, the distance between midpoints 506 of corresponding pairs of opposing sidewalls 518 is larger in the cross section 610b than in the cross section 610a. In particular, a distance D6 between midpoints 506 of the top and bottom sidewalls 518t and 518b in the cross section 610b is greater than a distance D5 between the midpoints 506 of the top and bottom sidewalls 518t and 518b in the cross section 610a. Similarly, a distance D8 between midpoints 508 of the left and right sidewalls 518l and 518r in the cross section 610b is greater than midpoints 508 of the left and right sidewalls 518l and 518r in the cross section 610a. However, distances between midpoints 506 and 508 in each respective cross section are equal. That is, the distance D5 and D7 of the cross section 610a are equal and distances D6 and D8 of the cross section 610b are also equal.

Various aspects of the sidewalls 518 of the housing 510 may be modified to change characteristics of the two-dimensional pattern produced by the laser light projection apparatus 100. One aspect of the two-dimensional pattern that may be adjusted is the shape of the segments or sides comprising the two-dimensional pattern. For example, instead of having a rectangular two-dimensional pattern 402 with straight segments 404, a two-dimensional pattern may be produced having convex or concave lateral cross-sectional segments with respect to the center axis 122. Sidewalls 518 that are less convex (e.g., have a smaller area of parabolic sector) than the sidewalls depicted in FIGS. 6A and 6B, or which are straight, may be used to produce a polygonal two-dimensional pattern having lines or segments that are convex with respect to the axis 122. Conversely, a housing 510 having sidewalls 518 that are more convex with respect to the axis 122 than the sidewalls depicted in FIGS. 6A and 6B may be used to produce a polygonal two-dimensional pattern having lines or segments that are concave with respect to the axis 122.

As another example of an aspect of the sidewalls 518 that can be modified to change characteristics of the two-dimensional pattern 402 produced, the angle $\theta_1$ of the sidewalls 518 may be adjusted to change the distance between opposing segments 404. For example, increasing the angles $\theta_{1T}$ and $\theta_{1B}$ relative to the angles $\theta_{1L}$ and $\theta_{1R}$ will generate a two-dimensional pattern having horizontal segments 404a spaced closer together than the vertical segments 404b according to the inverse relationship of the angle $\theta_1$ to the size of the projected two-dimensional pattern. Reducing the angles $\theta_1$ of opposing sidewalls 118 below a certain threshold may eliminate the corresponding segments 404 of the two-dimensional pattern 402 altogether. For example, reducing the angles $\theta_{1L}$ and $\theta_{1R}$ to or below −10° may produce a two-dimensional pattern without left and right segments 404. Specifically, the divergent portion 126 of the laser light 102 reflected on sidewalls 118 having an angle $\theta_1$ less than a certain threshold may be absorbed by internal non-reflective surfaces of the laser light projection apparatus 100 instead of being emitted from the aperture 116.

Another aspect of the two-dimensional pattern that may be changed is the number and geometry of segments. In particular, the geometry and number of sidewalls 518 may be increased to increase the number of segments 404 and the geometry of the two-dimensional pattern 402.

Reflective properties of the sidewalls 518 or portions thereof may be adjusted to change characteristics of the two-dimensional pattern 402. In some implementations, some of the sidewalls 518 may have different reflective properties than other sidewalls 518. For example, some of the sidewalls 518 may have a low reflectivity (e.g., less than 20%) or not be reflective at all to reduce or eliminate the visibility of corresponding segments 404. In some implementations, portions of sidewalls 118 may have different reflective properties than other portions of the same sidewall 118, or than corresponding portions of different sidewalls 118. The reflective properties of sidewalls 518 and portions thereof may be changed by physically increasing the roughness of the sidewalls 518 (e.g., by abrasion) or by applying a coating to the sidewalls 518 having a low reflectivity or reducing the smoothness.

Figure 7:
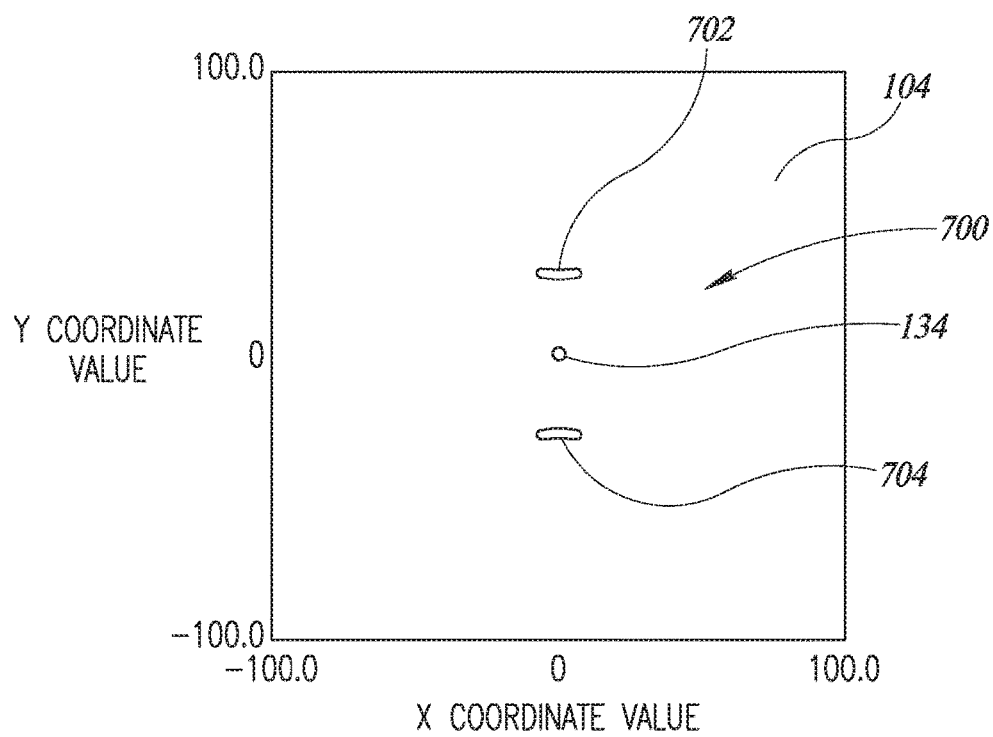
FIG. 7 is a plan view of a fourth projection of laser light having two-dimensional patterns projected onto a surface of a target object by a laser light projection apparatus of FIG. 1 according to one or more implementations.

Other two-dimensional patterns around the axis 122 or the spot 134 may be generated. For example, FIG. 7 shows a two-dimensional pattern 700 projected by the laser light projection apparatus 100 onto the surface 104 of a target object 106. The two-dimensional pattern 700 comprises a pair of segments 702 and 704 respectively positioned above and below the spot 134 on the surface 104 without left and/or right segments positioned on sides of the spot 134. The upper segment 702 has a downwardly curving shape that is convex with respect to the spot 134 and the lower segment 704 has an upwardly curving shape that is also convex with respect to the spot 134.

The upper segment 702 and lower segment 704 may be produced as a result of at least some of the divergent portion 126 of the laser light 102 being reflected from top and bottom sidewalls 518t and 518b that are flat or convex with respect to the axis 122. The left and right sidewalls 518l and 518r do not cause emission of the divergent portion 126 from the aperture 116 in this implementation. For example, the left and right sidewalls 518l and 518r may be oriented at angles $\theta_{1L}$ and $\theta_{1R}$ such that the divergent portion 126 incident upon the left and right sidewalls 518l and 518r is reflected and absorbed by other non-reflective surfaces within the laser light projection apparatus 100. As another example, the surfaces of the sidewalls 518l and 518r may have a low reflectivity resulting in a majority of the divergent portion 126 incident thereon to be absorbed or to not be visible to the naked human eye on the surface 104.

Two-dimensional patterns having shapes other than those illustrated and described may be generated using the laser light projection apparatus 100 described herein. The two-dimensional patterns may be, for instance, triangular or be non-symmetric about both the X and Y axes transverse to the axis 122. The two-dimensional patterns may have sinuous or sawtooth segments between vertices by designing a housing with sidewalls having a corresponding sinuous or sawtooth lateral cross-sectional profile.

Figure 8:
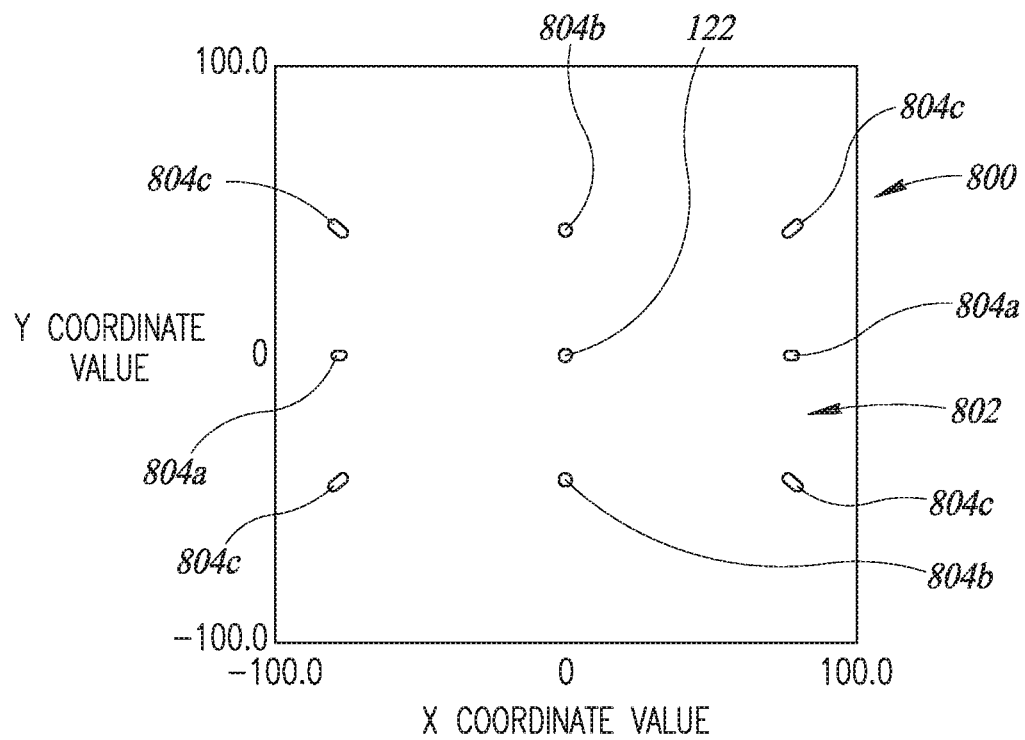
FIG. 8 is a plan view of a fifth projection of laser light comprising a plurality of spots projected onto a surface of a target object by a laser light apparatus according to one or more implementations.

FIG. 8 shows a projection 800 of laser light 102 projected by a laser light apparatus according to one or more implementations. The projection 800 comprises a two-dimensional pattern 802 spaced apart from the central axis 122. The two-dimensional pattern 802 comprises a plurality of spots 804 concentrically arranged around and spaced apart at distances from the central axis 122. The plurality of spots 804 are also spaced apart from one another around the central axis 122. The plurality of spots 804 are arranged in a pattern corresponding to the lateral cross-section of the sidewalls forming the cavity of the housing, as described herein. In this instance, the plurality of spots 804 are arranged in a rectangular pattern around the central axis 122. The plurality of spots 804 comprise a set of spots 804a arranged on sides of the central axis 122 along an X-axis about which the central axis 122 is centered, a set of spots 804b arranged above and below the central axis along a Y-axis about which the central axis is centered, and a set of spots 804c arranged diagonally with respect to the center axis 122.

Figure 9:
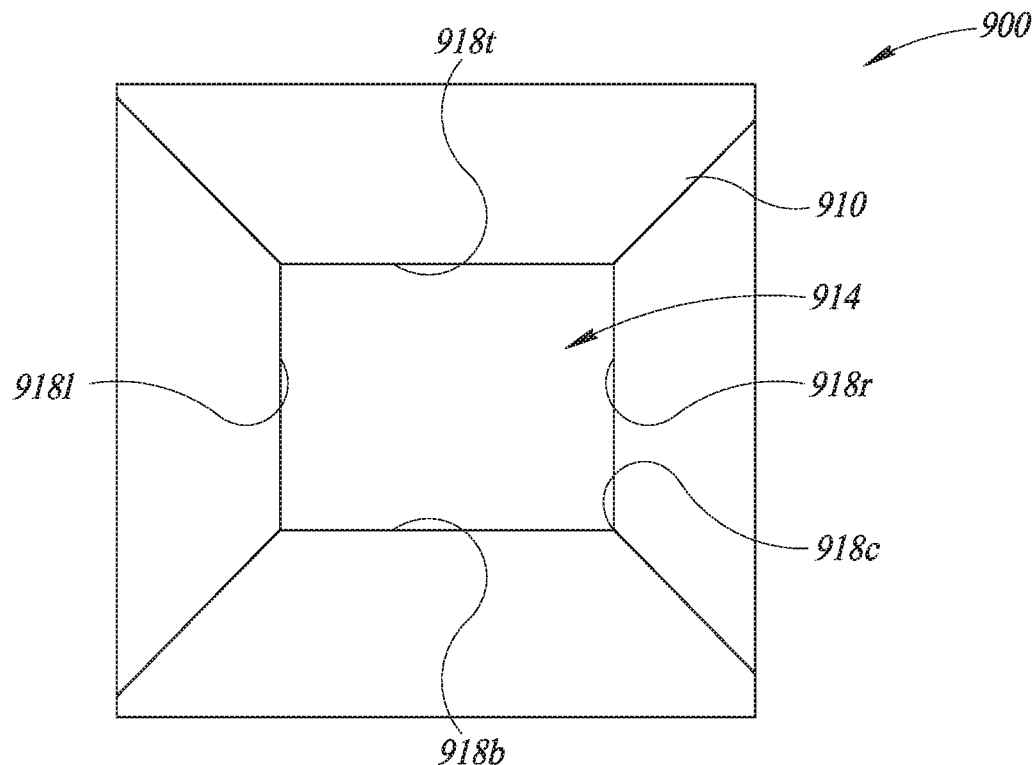
FIG. 9 is a lateral cross-sectional view of the housing of the laser light projection apparatus according to one or more implementations.

FIG. 9 shows a lateral cross section 900 of a housing 910 of a laser light projection apparatus used to generate the projection 800 of FIG. 8. The lateral cross section 900 is taken along a plane transverse to the central axis 122, such as along line A-A or line B-B of FIGS. 5A and 5B. The housing 910 has two pairs of opposing sidewalls 918 defining a cavity 914. A first pair of the sidewalls 918 includes left and right sidewalls 918*l* and 918*r* extending in parallel to the Y-axis and separated by a first distance. A second pair of the sidewalls 918 includes top and bottom sidewalls 918*t* and 918 extending in parallel to the X-axis and separated by a second distance, which may be the same as or different than the first distance. Adjacent sidewalls 918 are joined at corners 918c to form a rectangular shape defining the cavity 914. Some or all of the sidewalls 918 may be oriented at an angle $\theta_1$ with respect to the central axis 122 along the longitudinal length of the cavity 914 as depicted in FIGS. 5A and 5B for the sidewalls 518.

Laser light 102 emitted from an aperture at an end of the cavity 914 forms the two-dimensional pattern 802 depicted in FIG. 8. Some of the divergent portion 126 of the laser light 102 emitted from the laser light source 108 is reflected from reflective surfaces of the first pair of sidewalls 918*l* and 918*r* to form the set of spots 804a arranged in parallel to the X-axis. Some of the divergent portion 126 is reflected from reflective surfaces of the second pair of sidewalls 918*t* and 918*b* to form the set of spots 804b arranged in parallel to the Y-axis. Some of the divergent portion 126 is reflected from reflective surfaces at the corners 918c to form the set of spots 804c arranged diagonally with respect to the center axis 122.

Figure 10:
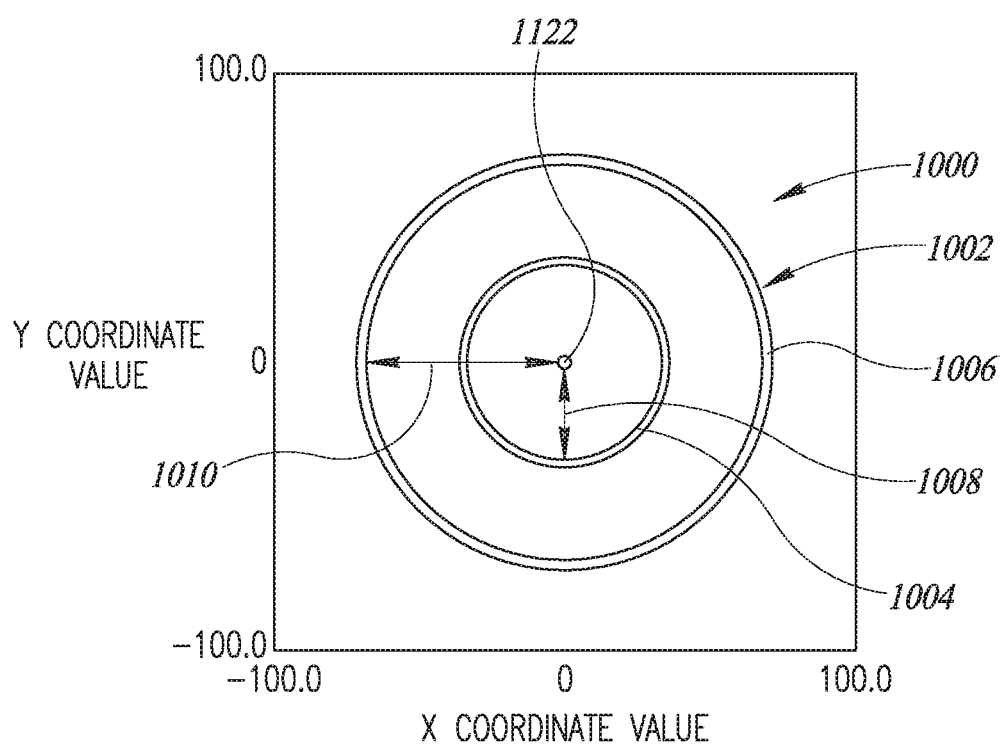
FIG. 10 is a plan view of a sixth projection of laser light comprising a two-dimensional pattern having a plurality of pattern portions according to one or more implementations.

According to some implementations, a laser light projection apparatus may be implemented that projects a two-dimensional pattern that has a plurality of portions concentrically spaced apart from each other. FIG. 10, for example, shows a projection 1000 having a two-dimensional pattern 1002 having a first pattern portion 1004 and a second pattern portion 1006 concentrically spaced apart from the first pattern portion 1004. The first pattern portion 1004 has an annular shape spaced apart from the central axis 1122 at a first distance 1008. The second pattern portion 1006 also has an annular shape spaced apart from the central axis 1122 at a second distance 1010 greater than the first distance 1008. The first pattern portion 1004 and the second pattern portion 1006 are portions both concentrically arranged about the central axis 1122 and which are separate from each other.

Figure 11:
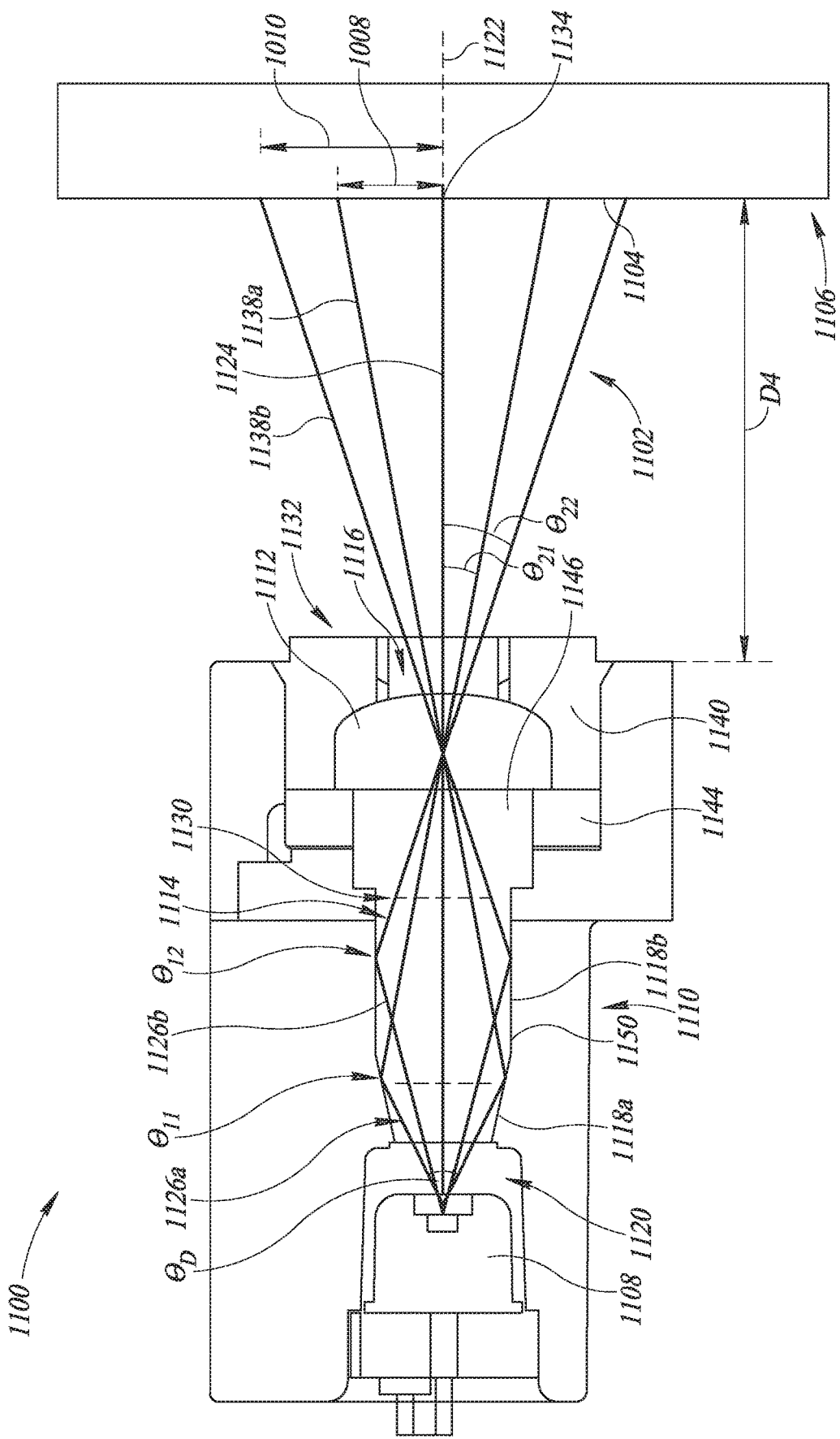
FIG. 11 is a first longitudinal cross-sectional view of a second laser light projection apparatus according to one or more implementations.

FIG. 11 shows a laser light projection apparatus 1100 projecting laser light 1102 onto a surface 1104 of a target object 1106 according to one or more implementations. The laser light projection apparatus 1100 has features similar to the laser light projection apparatus 100 discussed herein. The laser light projection apparatus 1100 has features that produce a projection having a two-dimensional pattern with a plurality of portions concentrically spaced apart from one another, such as the projection 1000 described above with respect to FIG. 10.

The laser light projection apparatus has a laser light source 1108 that projects laser light 1102 into a cavity 1114 defined by sidewalls 1118 of a housing 1110. A divergent portion 1126 of the laser light 1102 is reflected from the sidewalls 1118 and out of an aperture 1116 of the housing 1110 to form a two-dimensional pattern spaced apart from a central portion 1124 of the laser light 1102 forming a spot 1134 on the surface 1104. The sidewalls 1118 have a first sidewall portion 1118a and a second sidewall portion 1118b located farther from the laser light source 1102 along the central axis 1122 than the first sidewall portion 1118a. The first sidewall portion 1118a has walls oriented at a first angle $\theta_{11}$ with respect to the central axis 1122 and the second sidewall portion 1118b has walls oriented at a second angle $\theta_{12}$ with respect to the central axis 1122. The second angle $\theta_{12}$ is a different angle than the first angle $\theta_{11}$. The angle of the sidewalls 1118 changes from the first angle $\theta_{11}$ to the second angle $\theta_{12}$ at a junction 1150 between the first sidewall portion 1118a and the second sidewall portion 1118b. As a result, a first portion 1126a of the divergent portion 1126 of laser light 1102 is reflected from the first sidewall portion 1118a at an angle $\theta_{21}$ with respect to the central axis 1122 and a second portion 1126a of the divergent portion 1126 is reflected from the second sidewall portion 1118b at an angle $\theta_{22}$ different than the angle $\theta_{21}$.

Figure 12:
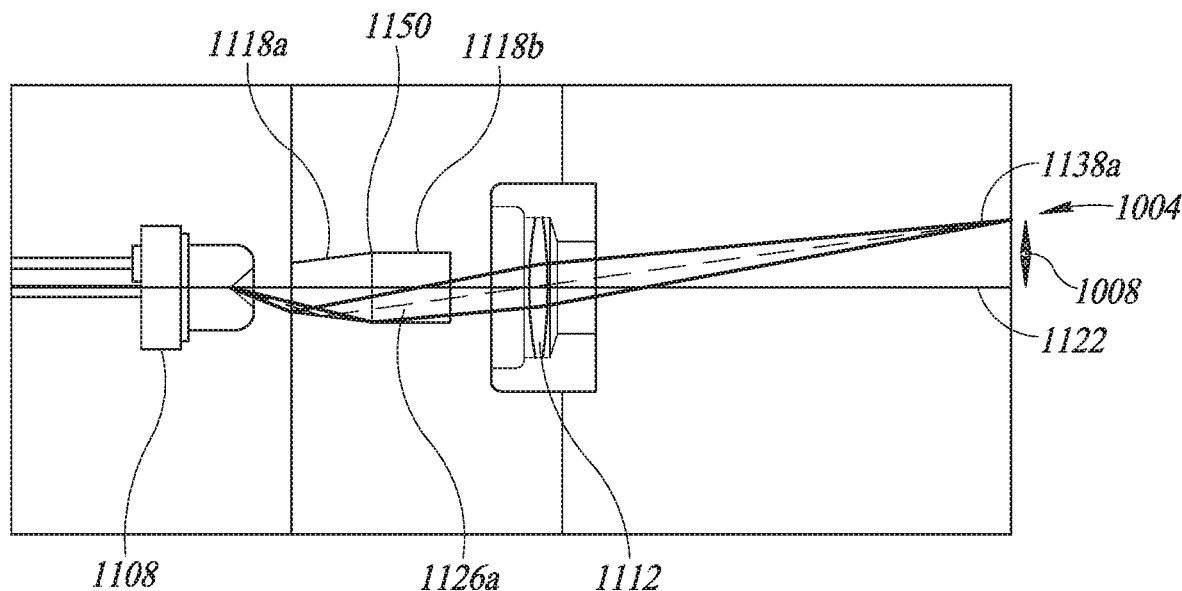
FIG. 12 is the longitudinal cross-sectional view of the second laser light projection apparatus of FIG. 11 projecting a first pattern portion of the two-dimensional pattern of FIG. 10.

FIG. 12 shows the laser light projection apparatus 1100 projecting the first divergent portion 1126a and not the second divergent portion 1126b for ease of visualization. The first divergent portion 1126a comprises a plurality of beams of laser light, which are reflected and emitted from the aperture 1116 of the housing 1110 as first beams 1138a of laser light 1102. The first beams 1138a are oriented at the angle $\theta_{21}$ with respect to the central axis 1122. The first beams 1138a incident upon the surface 1104 form the first pattern portion 1004 of the two-dimensional pattern 1002 spaced apart from the central axis 1122 at the distance 1008. The distance 1008 depends on the angle $\theta_{11}$ of the first sidewall portion 1118a and can be adjusted based on the inverse relationship of the angle $\theta_{11}$ to the distance 1008. For example, decreasing the angle $\theta_{11}$ increases the distance 1008 of the first pattern portion 1004 from the central axis 1122.

Figure 13:
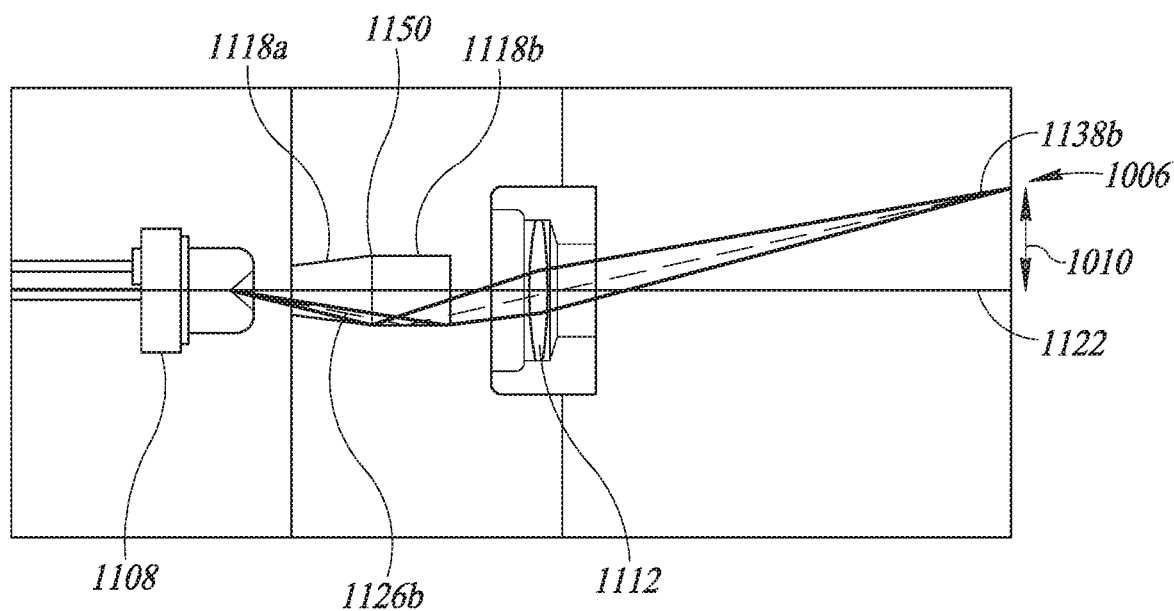
FIG. 13 is the longitudinal cross-sectional view of the second laser light projection apparatus of FIG. 11 projecting a second pattern portion of the two-dimensional pattern of FIG. 10.

FIG. 13 shows the laser light projection apparatus 1100 projecting the second divergent portion 1126b and not the first divergent portion 1126a for ease of visualization. The second divergent portion 1126b comprises a plurality of beams different from the beams of the first divergent portion 1126a, the second divergent portion 1126b is reflected and emitted from the aperture 1116 as second beams 1138b of laser light 1102. The second beams 1138b are oriented at the angle $\theta_{22}$ with respect to the central axis 1122. The second beams 1138b incident upon the surface 104 form the second pattern portion 1006 of the two-dimensional pattern 1002 spaced apart from the central axis 1122 at the distance 1010. The distance 1010 similarly depends on the angle $\theta_{12}$ of the second sidewall portion 1118b and can be adjusted based on the inverse relationship of the angle $\theta_{12}$ to the distance 1010.

In some implementations, the angles $\theta_{11}$ and $\theta_{12}$ are non-zero angles. In some implementations, one of the angles $\theta_{11}$ and $\theta_{12}$ is zero such that one of the sidewall 1118 portions is parallel to the center axis 1122 and the other one of the angles $\theta_{11}$ and $\theta_{12}$ is a non-zero angle. Additional pattern portions may be added to the two-dimensional pattern 1002 with the addition of additional sidewall portions.

In some implementations, the laser light projection apparatus 100 (or where appropriate the laser light projection apparatus 1100) may have a configuration preventing emission of the central portion 124 of the laser light 102 such that the spot 134 is not visible on the surface 104. In particular, a central portion of the laser light 102 emitted from the laser light source 108 may be occluded to prevent transmission of the central portion 124. For example, a central portion of a protection window protecting a laser diode packaging of the laser light source 108 may be covered in a non-transmissive coating or material, such as with a black or dark-colored paint that absorbs the majority of the central portion 124 before it can be emitted to form the spot 134 on the surface 104 of the target object 106. As another example, a transparent window having a central portion covered in or containing a non-transmissive coating or material may be installed between the laser light source 108 and the lens 112 to occlude the central portion 124 of the laser light 102. In such implementations, only the two-dimensional pattern is visible on the surface 104 without the accompanying spot 134. A portion of the collimating lens 112 concentrically spaced apart from the central axis 1122 may be occluded to reduce the thickness of the two-dimensional pattern produced.

The laser light projection apparatus 100 provides numerous advantages over previously-implemented solutions. Previous solutions for generating two-dimensional patterns required diffractive optical elements and/or compound or complex refractive lenses to split, homogenize, and/or shape light into the desired pattern. By comparison, the laser light projection apparatus 100 may be implemented using a single laser focusing lens (i.e., the collimating lens 112), thereby simplifying and reducing the cost of the overall design over previously-implemented solutions. Moreover, previously-implemented designs required alignment of a plurality of optical elements during or in connection with assembly of the device to ensure that the desired pattern is produced and properly aligned. The laser light projection apparatus 100 of the instant disclosure avoids issues involving alignment during assembly. Furthermore, previous implementations of laser light projectors achieved an optical power efficiency of approximately 20%. The laser light projection apparatus 100 of the instant disclosure, by contrast, achieves an optical power efficiency for the laser light source 108 of approximately 40% due to the reflective surfaces of the sidewalls, which reduce the amount of laser light 102 absorbed by internal surfaces.

Figure 14:
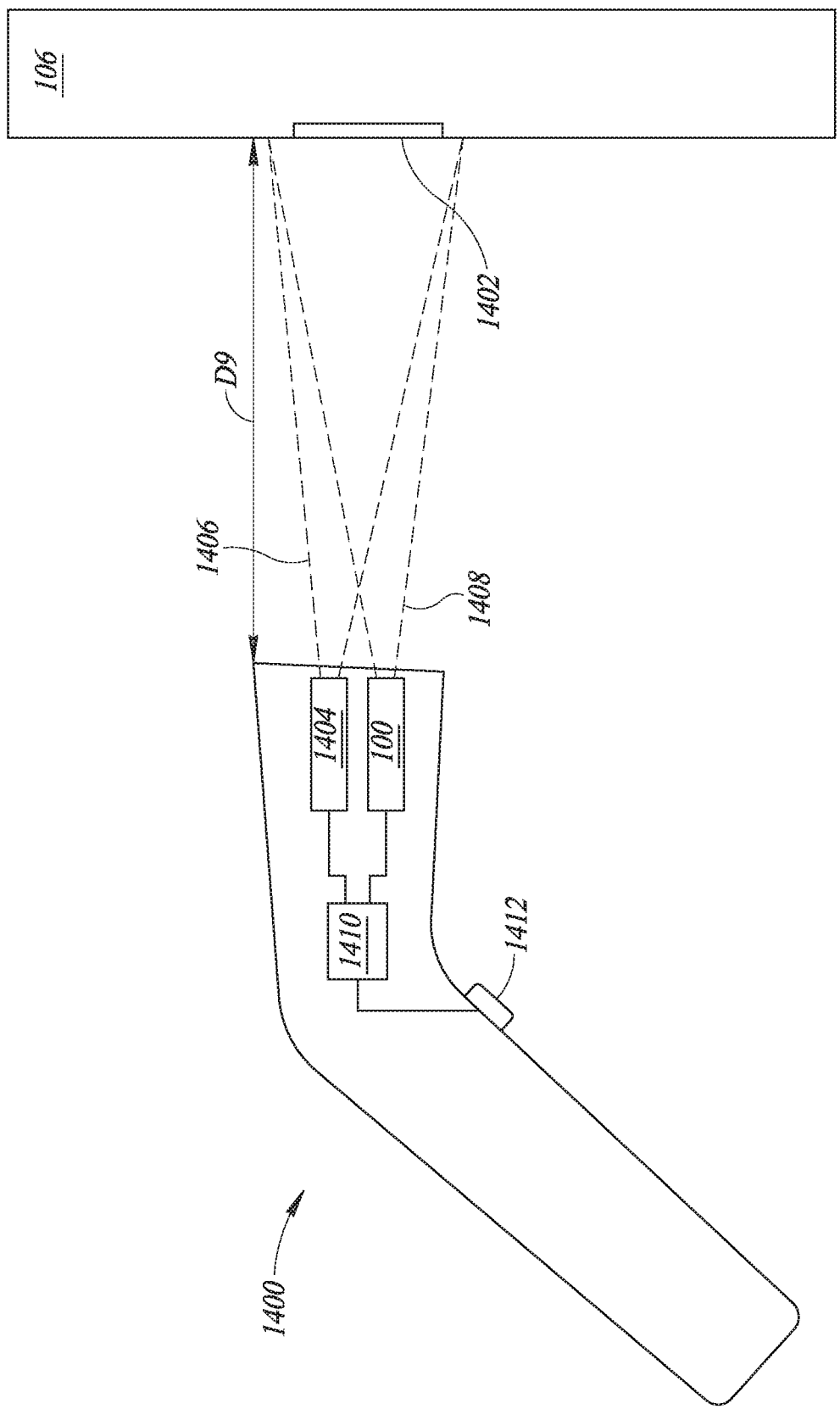
FIG. 14 is a schematic diagram of a machine-readable symbol reader including the laser light projection apparatus of FIG. 1 according to one or more implementations.

The laser light projection apparatus 100 may be used to indicate a field of view of an optical device. FIG. 14 shows the laser light projection apparatus 100 as part of machine-readable symbol reader 1400 that reads a machine-readable symbol 1402 on the surface 104 of the target object 106, such as a barcode symbol reader. The machine-readable symbol reader 1400 includes a machine-readable symbol reader subsystem 1404 that captures light reflected from the surface 104 and received at the machine-readable symbol reader 1400 to obtain information regarding the machine-readable symbol 1402. The machine-readable symbol reader subsystem 1404 comprises one or more photosensors (e.g., photodiodes, phototransistors) that generate a signal representative of the light received from the surface 104. The machine-readable symbol reader subsystem 1404 has a field of view 1406 (FOV) in which the one or more photosensors may detect light or other electromagnetic radiation. The FOV 1406 may have a lateral cross-sectional area having a rectangular shape, although other shapes are possible depending on the type and arrangement of the one or more photosensors or an aperture shape of the reader subsystem 1404. For instance, a FOV 1406 having a circular shape may be achieved using a circular aperture for the symbol reader subsystem 1404. The machine-readable symbol 1402 may be an image, visual pattern, or arrangement of alphanumeric characters or shapes (e.g., lines, rectangles) representing or including information. Examples of the machine-readable symbol 1402 include barcode symbols, area or matrix code symbols (e.g., Quick Response code symbols), and/or other characters (e.g., alpha, alphanumeric, text), by way of non-limiting example. In some implementations, as described below, the photosensors may instead be imaging sensors (e.g., charge-coupled device (CCD) imaging sensors, complementary metal-oxide semiconductor (CMOS) imaging sensors) that obtain imaging data representative of the FOV 1406, as described below in further detail.

The laser light projection apparatus 100 is arranged within the machine-readable symbol reader 1400 such that a projection 1408 generated by the laser light projection apparatus 100 matches the FOV 1406. The laser light projection apparatus 100 and the one or more photosensors of the machine-readable symbol reader subsystem 1404 are positioned relative to each other such that a size and shape of the FOV 1406 of the surface 104 matches the size and shape of the projection 1408 on the surface 104. For example, for a machine-readable symbol reader subsystem 1404 having a rectangular FOV 1406 with a given field of view angle, the laser light projection apparatus 100 may be located adjacent to the machine-readable symbol reader subsystem 1404 such that the projection 1408 is coincident upon the same area as the FOV 1406 on the surface 104. As a result, a user of the machine-readable symbol reader 1400 may align a two-dimensional pattern of the projection 1408 with a periphery of the machine-readable symbol 1402 to capture optical information in the FOV 1406.

Although the FOV 1406 and the projection 1408 of the machine-readable symbol reader 1400 in FIG. 8 are depicted as being non-overlapping in some portions between the machine-readable symbol reader 1400 and the surface 104, this is provided only for ease of illustration. In actual implementation, the machine-readable symbol reader subsystem 1404 and the laser light projection apparatus 100 may be in such close proximity and alignment that the field of view 1406 and projection 1408 are identical within a certain range of distances D9. There may be some range of distances D9 between the machine-readable symbol reader 1400 and the surface 104 at which the FOV 1406 and the projection 1408 are aligned such that the machine-readable symbol reader subsystem 1404 can effectively resolve the machine-readable symbol 1402 based on the projection 1408 presented.

The machine-readable symbol reader 1400 may include circuitry 1410 that interacts with and controls one or more operations of the laser light projection apparatus 100 and/or machine-readable symbol reader subsystem 1404. For example, the circuitry 1410 may include a controller electrically coupled to the laser light projection apparatus 100 and/or the machine-readable symbol reader subsystem 1404. The controller may send control signals causing the laser light projection apparatus 100 to generate or cease generation of the laser light 102, or control signals causing the machine-readable symbol reader subsystem 1404 to perform operations for capturing optical information using the one or more photodetectors.

The controller of the circuitry 1410 may transmit the control signals in response to an input provided to the circuitry 1410 for initiating operations of the laser light projection apparatus 100 and/or the machine-readable symbol reader subsystem 1404. In some implementations, the machine-readable symbol reader 1400 may be a handheld device with one or more switches 1412 (e.g., trigger, button) that, as a result of being depressed or released, cause input events to be provided to the circuitry 1410. As one particular example, the switch 1412 may be a trigger that, in response to being depressed, causes a first input to be provided to the circuitry 1410. In response, the circuitry 1410 may send a control signal causing the laser light projection apparatus 100 to generate the laser light 102 and emit the projection 1408. The circuitry 1410 may cause the laser light projection apparatus 100 to emit the projection 1408 for as long as the switch 1412 is depressed. As a result of a second input event for the one or more switches 1412 (e.g., trigger being released, second button being pushed) after the first event, a second input may be provided to the circuitry 1410. In response to the second input, the circuitry 1410 may send a control signal causing the machine-readable symbol reader subsystem 1404 to capture optical information (i.e., the machine-readable symbol 1402) using the one or more photodetectors. The circuitry may further include a processor that processes the optical information captured for the machine-readable symbol 1402.

The laser light projection apparatus 100 (or laser light projection apparatus 1100 when appropriate) may be implemented in other machine-readable symbol reader devices than a handheld device. For example, the laser light projection apparatus 100 may be used as part of an image acquisition system that obtains imaging data using an imaging sensor. Image acquisition systems may include imaging sensors comprising, e.g., CCD or CMOS imaging sensors to obtain and provide imaging information representative of the field of view of the imaging sensor. Such image acquisition systems may include camera and smart camera technologies. The image acquisition systems may be part of a handheld device or part of a robotic system employing machine vision to perform automatic imaging operations. Such machine vision applications may be useful in industrial settings (e.g., factories, shipping warehouses) to recognize objects without machine-readable symbols or codes, or other image-recognition related applications, such as detecting damage or defect in objects. In some image acquisition systems, a display or viewing window is provided showing the user the field of view of the imaging sensors. The laser light projection apparatus 100 may be implemented in an image acquisition system to obviate the need for a display or viewfinder, and to facilitate the use of image acquisition systems in machine vision applications. The laser light projection apparatus 100 may be implemented with an image acquisition system in a manner similar to the machine-readable symbol reader 1400 discussed above, with the exception that the symbol reader subsystem 1404 is replaced by an image acquisition subsystem comprising one or more imaging sensors (e.g., CMOS sensor, CCD sensor). In such implementations, the laser light 102 emitted from the laser light projection apparatus 100 may be projected inside the FOV 1406 of the image acquisition subsystem such that a defined two-dimensional pattern formed by the laser light 102 is used as an aimer for the acquiring image information using the image acquisition subsystem. The image acquisition system may be part of industrial machinery or a robotic entity instead of being part of a handheld imaging device.

As another example, the laser light projection apparatus 100 may be part of an industrial optical reader system that scans a large number of target objects 106 having machine-readable symbols 102, such as a postal sorting machine. As a further example, the laser light projection apparatus may be part of a medical imaging system, such as an X-ray machine, to indicate an area to be imaged. These illustrations are intended to be non-limiting examples of the myriad applications for the laser light projection apparatus 100 described herein.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A laser light projection apparatus, comprising:
  a laser light source that generates laser light centered along a center axis; and
  a housing having an aperture from which the laser light generated by the laser light source is emitted and a cavity extending along a center axis of the laser light source and being defined at least in part by sidewalls at least a portion of which have a reflective surface, wherein the reflective surface of the sidewalls cause a portion of the laser light to be emitted from the aperture at angles divergent from the center axis, and at least part of said portion of the laser light emitted from the aperture forms a defined two-dimensional pattern spaced apart from the center axis.

2. The laser light projection apparatus of claim 1 wherein one or more of the sidewalls are oriented at an acute angle with respect to the central axis.

3. The laser light projection apparatus of claim 1 wherein a cross-sectional area of the cavity increases along a length of the center axis in a direction toward the aperture.

4. The laser light projection apparatus of claim 1 wherein the defined two-dimensional pattern formed has a circular shape.

5. The laser light projection apparatus of claim 4 wherein the cavity has a circular cross-sectional shape defined by the sidewalls.

6. The laser light projection apparatus of claim 4 wherein the circular shape has a thickness corresponding to a length of the reflective surface in a direction along the center axis.

7. The laser light projection apparatus of claim 1 wherein the defined two-dimensional pattern formed has a rectangular shape.

8. The laser light projection apparatus of claim 7 wherein the cavity is defined by two or more pairs of the opposing sidewalls.

9. The laser light projection apparatus of claim 8 wherein each of the sidewalls has a curvilinear shape concave with respect to the center axis.

10. The laser light projection apparatus of claim 8 wherein a first pair of the two or more pairs of opposing sidewalls is oriented at a first angle with respect to the center axis and a second pair of the two or more pairs of opposing sidewalls is oriented at a second angle with respect to the center axis, the second angle being different than the first angle.

11. The laser light projection apparatus of claim 1 wherein a size of the defined two-dimensional pattern corresponds to an acute angle of the sidewalls with respect to the center axis.

12. The laser light projection apparatus of claim 11 wherein the angles of the laser light emitted from the aperture correspond to an angle at which the sidewalls are oriented with respect to the center axis.

13. The laser light projection apparatus of claim 1, further comprising a single collimating lens positioned in the housing between the cavity and the aperture.

14. The laser light projection apparatus of claim 13 wherein the single collimating lens has a central portion occluding the laser light.

15. The laser light projection apparatus of claim 1 wherein the cavity has a frustoconical shape centered along the center axis, a wider end of the cavity being located closer to the aperture than a narrower end of the cavity.

16. The laser light projection apparatus of claim 1 wherein the defined two-dimensional pattern comprises a first pattern portion and a second pattern portion spaced apart from the first pattern portion farther from the center axis than the first portion.

17. The laser light projection apparatus of claim 1 wherein the sidewalls of the housing have a first sidewall portion having a reflective surface oriented at a first angle with respect to the center axis and a second sidewall portion with a reflective surface oriented at a second angle with respect to the center axis, wherein the first angle is different than the second angle.

18. The laser light projection apparatus of claim 1 wherein the defined two-dimensional pattern comprises a plurality of spots concentrically arranged at distances from the center axis.

19. An image acquisition system, comprising:
  a housing having a cavity delimited by at least one sidewall and having a principal axis, the cavity which extends along the principal axis from a first position to an aperture, at least a portion of the sidewall of cavity having a reflective surface; and
  a laser light source that emits laser light, the laser light source positioned and oriented to emit a first portion of the laser light along a principal emission axis that is co-linear with the principal axis of the cavity and emit a second portion of the laser light toward the at least one sidewall of the cavity, wherein the reflective surface of the at least one sidewall of the cavity cause a second portion of the laser light to be emitted from the aperture at angles divergent from the principal emission axis, and wherein at least part of the second portion of the laser light forms a defined two-dimensional pattern spaced apart from the center axis.

20. The image acquisition system of claim 19 wherein said image acquisition system has a field of view and at least a portion of the laser light emitted is projected inside said field of view, and said portion of laser light is used as an aimer of the image acquisition system.

* * * * *